J. W. ARNDT.
DEVICE FOR TALLYING LUMBER.
No. 23,537.                                         Patented Apr. 12, 1859.
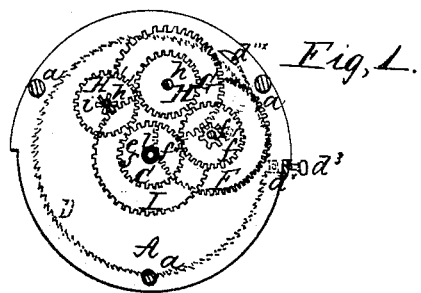
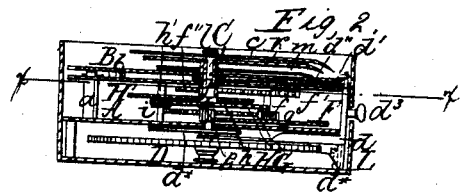
Witnesses,
John P. Arndt
T. R. Cotton
Inventor,
J. Wallen Arndt

UNITED STATES PATENT OFFICE.

J. WALLACE ARNDT, OF GREEN BAY, WISCONSIN.

MACHINE FOR NOTING THE SUMS OF NUMBERS ADDED.

Specification of Letters Patent No. 23,537, dated April 12, 1859.

*To all whom it may concern:*

Be it known that I, J. W. ARNDT, of Green Bay, in the county of Brown and State of Wisconsin, have invented a new and Improved Device for Tallying Lumber, &c.; and I do hereby declare that the following is a full, clear, and exact description of the same, reference being had to the accompanying drawings, making part of this specification, in which—

Figure 1 represents a horizontal section of my device, the case being removed and the section taken in the line $x$, $x$, Fig. 2, and Fig. 2 is a vertical central section of ditto.

Similar letters in both views refer to corresponding parts.

This invention consists in arranging a swivel arm with a pointer in such relation to a ratchet wheel and to a dial plate marked with units, hundreds and thousands, that by turning the arm until the pointer points to a certain figure in the unit scale of the dial plate, the ratchet wheel is rotated and that by this operation and by the aid of a series of pinions and gear wheels 3 indexes are rotated on the face of the dial, one of which indicates the units, the other the hundreds and the third the thousands.

To enable those skilled in the art to fully understand use and construct my invention I will proceed to describe it.

A, represents a frame consisting of two plates, which are kept a certain distance apart by means of three pillars $a, a, a,$ and a dial plate B, is firmly secured to the top of this frame by means of screws, which pass through bosses $b$, attached to the under side of the dial so that a certain space is left between the same and upper surface of the frame.

C, is a central arbor which extends through the frame and through the dial plate, and firmly attached to its under end is a ratchet wheel D, which is operated by means of a swivel arm $d$, which embraces the arbor C, close over the ratchet wheel and which is bent up so as to extend beyond the dial, where it bears a pointer $d'$, and a strap $d''$, which embraces the arbor above the frame A, and in the space between the dial and the frame, serves as an additional guide to the arm $d$. A pawl $d^*$, is attached to this arm which gears into the teeth of the ratchet wheel, and the arm is operated by means of a button $d^3$. The under end of the arms $d$, close over the ratchet wheel D, is attached to a coiled spring $d'^*$, which brings the arm back to its original position when the hand, which operates the same relaxes, and a spring hook $d''^*$, (see Fig. 1) is so arranged that the ratchet wheel can move in one direction only, and that it is prevented from going back when the arm $d$, returns to its original position.

The dial plate B, is marked with three scales, units, hundreds and thousands, and an index $c$, is attached to the arbor C, which indicates the units. Rigidly attached to the arbor C, is the pinion $e$, which gears into a cog wheel F, on an arbor $f$, to which a pinion $g$, is attached, which gears into a cog wheel G, on an arbor $h$, to which a wheel H, is attached which gears into another wheel H', of the same size which is attached to an arbor $h'$, and a pinion $i$, from the same arbor gears into a wheel I, which is attached to a tube $j$, through which the arbor C, passes freely. This tube extends beyond the dial plate, and attached to its upper end is the index $k$, and the pinions and wheels which operate this index are in such proportion, that the same marks the thousands when the first index $c$, marks the units. Attached to the arbor F is also a smaller cog wheel $f'$, which gears in a wheel $f''$, of the same size, and this latter is attached to a tube $l$, which passes freely over the tube $j$, and which bears on its upper extremity the index M. The requisite quantity of motion of this index depends upon the proportion of the pinion $e$, and the cog wheel F, and this is such that the pinion has to rotate ten times until the wheel finishes one rotation so that the index M, marks the hundreds when the first index $c$, marks the units.

The whole is inclosed in a case L, through which the button $d^3$, extends so that the arm $d$, can be operated from the outside of the case.

The operation is as follows: If a quantity of lumber is to be tallied one man has to take the measure of one piece after the other and he sings out the number of feet of each piece. Another man holds the case L, and he turns the pointer $d'$, to the figure called for each piece, relaxing his hand after each motion so that the arm $d$, turns back to its original position. By these means the index $c$, is propelled from one figure to the other and the other two indexes begin to move slowly in proportion to the motion of the first index and at the end of the operation the quantity of lumber measured can be read from the dial, the index $k$, giving the thousands, the index $m$, the hundreds and the index $c$, the units of the number of feet measured.

It is obvious that this device may be used with equal advantage in all cases where a number of figures have to be added.

Having thus described my invention what I claim as new and desire to secure by Letters Patent is:

The arrangement of the three indexes $c$, $m$, and $k$, on a dial marked with units, hundreds and thousands in combination with the swivel arm $d$, the ratchet wheel D, and with the pinions $e$, $h$, and $i$, and with the gear wheels F, G, H, and I, or their equivalents to operate substantially as and for the purpose specified.

J. WALLACE ARNDT.

Witnesses:
JOHN P. ARNDT,
L. R. COTTON.